(12) United States Patent
Kim et al.

(10) Patent No.: US 11,772,637 B2
(45) Date of Patent: Oct. 3, 2023

(54) VEHICLE INDICATING PROGRESS OF AUTOMATIC PARKING PROCESS AND OPERATION METHOD OF THE SAME

(71) Applicants: Hyundai Motor Company, Seoul (KR); Kia Corporation, Seoul (KR)

(72) Inventors: In Mook Kim, Seoul (KR); Sun Woo Jeong, Siheung-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 197 days.

(21) Appl. No.: 17/341,738

(22) Filed: Jun. 8, 2021

(65) Prior Publication Data
US 2022/0203966 A1 Jun. 30, 2022

(30) Foreign Application Priority Data
Dec. 30, 2020 (KR) ........................ 10-2020-0188346

(51) Int. Cl.
*B60W 30/06* (2006.01)
*B60W 10/04* (2006.01)
(Continued)

(52) U.S. Cl.
CPC ............ *B60W 30/06* (2013.01); *B60W 10/04* (2013.01); *B60W 10/10* (2013.01); *B60W 10/18* (2013.01);
(Continued)

(58) Field of Classification Search
CPC ...... B60W 30/06; B60W 10/04; B60W 10/10; B60W 10/18; B60W 10/20; B60W 50/16; B60W 2050/143; B60W 2050/146; B60W 2510/1005; B60W 2510/205; B60W 2540/18; B60W 2540/215; B60W 2552/05; B60W 2552/40; B60W 2556/60; B60W 2710/20; B60W 2720/10; B60W 2720/12; B60W 50/14; B60W 30/143; B60W 40/02;
(Continued)

(56) References Cited

U.S. PATENT DOCUMENTS 10,395,332 B1 * 8/2019 Konrardy ............... G01S 19/485
2015/0217778 A1 * 8/2015 Fairgrieve ............. B60W 30/18
701/37
(Continued)

*Primary Examiner* — Jonathan M Dager
*Assistant Examiner* — Jean W Charleston
(74) *Attorney, Agent, or Firm* — Slater Matsil, LLP

(57) ABSTRACT

An embodiment vehicle includes a collecting device for collecting environment information, a user input for automatic parking of the vehicle, an automatic parking controller for performing the automatic parking based on the environment information and the user input, and a behavior controller for controlling a behavior of the vehicle in response to control of the automatic parking controller. The automatic parking controller calculates a first progress corresponding to determination of whether the user input is a wake-up request, a second progress corresponding to acquisition of a control right for the behavior controller, a third progress corresponding to whether the user input is an execution request for the automatic parking, a fourth progress corresponding to generation of control information for the behavior controller, and a fifth progress corresponding to control of the vehicle's behavior.

22 Claims, 12 Drawing Sheets

(51) Int. Cl.
*B60W 10/20* (2006.01)
*B60W 10/10* (2012.01)
*B60W 10/18* (2012.01)
*B60W 50/16* (2020.01)
*B60W 50/14* (2020.01)

(52) U.S. Cl.
CPC ............ *B60W 10/20* (2013.01); *B60W 50/16* (2013.01); *B60W 2050/143* (2013.01); *B60W 2050/146* (2013.01); *B60W 2510/1005* (2013.01); *B60W 2510/205* (2013.01); *B60W 2540/18* (2013.01); *B60W 2540/215* (2020.02); *B60W 2552/05* (2020.02); *B60W 2552/40* (2020.02); *B60W 2556/60* (2020.02); *B60W 2710/20* (2013.01); *B60W 2720/10* (2013.01); *B60W 2720/12* (2013.01)

(58) Field of Classification Search
CPC ............ B60W 40/10; B60W 60/0053; B60W 2050/0005; B60W 2556/45; B62D 15/0285; B60K 35/00; B60K 2370/152; B60K 2370/157; B60K 2370/158; B60K 2370/33; G05D 1/0088; G05D 2201/0213; B60Y 2300/06; B60Y 2300/143
USPC ......................................................... 701/25
See application file for complete search history.

(56) References Cited

U.S. PATENT DOCUMENTS

| | | | |
|---|---|---|---|
| 2016/0272244 A1* | 9/2016 | Imai | B62D 15/0285 |
| 2019/0039606 A1* | 2/2019 | Fujita | B60W 50/14 |
| 2020/0086793 A1* | 3/2020 | Watanabe | G06T 19/00 |
| 2020/0231141 A1* | 7/2020 | Edling | G08G 1/14 |
| 2020/0294401 A1* | 9/2020 | Kerecsen | G05D 1/0287 |
| 2020/0317216 A1* | 10/2020 | Konrardy | B60W 30/182 |
| 2020/0320999 A1* | 10/2020 | Kurihara | G06F 3/167 |
| 2021/0179174 A1* | 6/2021 | Shingai | B60T 17/221 |

\* cited by examiner

VEHICLE INDICATING PROGRESS OF AUTOMATIC PARKING PROCESS AND OPERATION METHOD OF THE SAME

CROSS-REFERENCE TO RELATED APPLICATIONS

This application claims the benefit of Korean Patent Application No. 10-2020-0188346, filed in the Korean Intellectual Property Office on Dec. 30, 2020, which application is hereby incorporated herein by reference.

TECHNICAL FIELD

The present disclosure relates to an automatic parking system.

BACKGROUND

An automatic parking system is a system that searches a parking space through an ultrasonic sensor mounted in front and rear portions of a vehicle, and automatically supports parking in and departing from the searched parking space. The automatic parking system allows a user to park simply by manipulating a button inside the vehicle or simply by manipulating a smart key outside the vehicle.

The automatic parking system may be designed to operate only when a user input is maintained for a preset time or more to prevent a movement of the vehicle in response to an incorrect input or malicious input of the user.

However, a time required for the parking and the unparking by the automatic parking system may vary depending on a parking environment of the vehicle. The parking environment may include, for example, a road surface slope, a road surface resistance, a presence or an absence of an obstacle, and the like. Therefore, when using the automatic parking system, the user is not able to intuitively know a time it takes for a movement of the vehicle, so that usability of the automatic parking system may be degraded. In addition, when the user is not able to identify a progress of control of the vehicle by the automatic parking system, it is difficult to know whether the automatic parking system is operating normally, so that a user convenience may be degraded.

SUMMARY

The present disclosure relates to an automatic parking system. Particular embodiments relate to a vehicle that delivers a progress of a process for performing automatic parking to a user. Embodiments of the present disclosure can solve problems occurring in the prior art while advantages achieved by the prior art are maintained intact.

In an embodiment of the present disclosure, a vehicle may start an automatic parking function based on a user input, and the vehicle may be controlled by an automatic parking controller from the start of the automatic parking function to a movement of the vehicle through the automatic parking function.

In another embodiment of the present disclosure, the vehicle may calculate a progress corresponding to a process for performing the automatic parking to output information corresponding to the progress through an output device included in the vehicle or an output device included in an external terminal.

In another embodiment of the present disclosure, the vehicle may provide the information corresponding to the progress to the user to allow the user to intuitively recognize an estimated time required for the automatic parking, and an operation of the vehicle by an incorrect input and a malicious input of the user may be prevented.

The technical problems to be solved by the present inventive concept are not limited to the aforementioned problems, and any other technical problems not mentioned herein will be clearly understood from the following description by those skilled in the art to which the present disclosure pertains.

According to an embodiment of the present disclosure, a vehicle includes a collecting device that collects environment information and a user input for automatic parking of the vehicle, an automatic parking controller that performs the automatic parking of the vehicle based on the environment information and the user input, and a behavior controller that controls a behavior of the vehicle in response to control of the automatic parking controller, wherein the automatic parking controller calculates a first progress corresponding to a process of determining whether the user input is a wake-up request, a second progress corresponding to a process of acquiring a control right for the behavior controller based on the user input, a third progress corresponding to a process of determining whether the user input is an execution request for the automatic parking, a fourth progress corresponding to a process of generating control information for the behavior controller based on the environment information, and a fifth progress corresponding to a process of controlling the behavior of the vehicle based on the control information.

In one implementation, the vehicle may include an output device that outputs information corresponding respectively to the first progress, the second progress, the third progress, the fourth progress, and the fifth progress, and the output device may include at least one selected from a group consisting of a display, a lighting device, an audio output device, and a haptic module.

In one implementation, the collecting device may include an input device, and the user input may be collected through the input device.

In one implementation, the automatic parking controller may determine that the user input is the wake-up request and calculate the first progress when the user input lasts for a first wake-up time or longer.

In one implementation, the vehicle may include a communication device, the communication device may receive an input signal from an external terminal, and the collecting device may collect the user input based on the input signal.

In one implementation, the environment information may include information on a location of a user, and the automatic parking controller may determine that the user input is the wake-up request and calculate the first progress when the location of the user is outside the vehicle and the user input based on the input signal lasts for a second wake-up time or longer.

In one implementation, the external terminal may include a terminal output device that outputs information corresponding to the first progress, the second progress, the third progress, the fourth progress, and the fifth progress, and the automatic parking controller may transmit the information corresponding to the first progress, the second progress, the third progress, the fourth progress, and the fifth progress to the external terminal through the communication device.

In one implementation, the automatic parking controller may initiate the acquisition of the control right for the behavior controller when the user input lasts for an automatic control activation time or longer.

In one implementation, the behavior controller may include at least one controller selected from a group consisting of a torque controller that controls a torque of the vehicle, a steering controller that controls a direction of the vehicle, a shift controller that controls a gear of the vehicle, a braking controller that controls deceleration of the vehicle, and a body controller that controls an electronic device included in the vehicle, and the automatic parking controller may calculate the second progress based on whether a control right for each of the torque controller, the steering controller, the shift controller, the braking controller, and the body controller is acquired.

In one implementation, the automatic parking controller may determine that the user input is the execution request for the automatic parking when the user input lasts for an automatic parking request time or longer, and calculate the third progress when the user input is determined to be the execution request for the automatic parking.

In one implementation, the environment information may include information on a parking space and information on a road surface resistance, the control information for the behavior controller may include steering information for a behavior direction of the vehicle, shift information for controlling a moving speed of the vehicle, and torque information for the vehicle to overcome the road surface resistance, and the automatic parking controller may calculate the fourth progress based on at least one of the steering information, the shift information, and/or the torque information when the user input is determined to be the execution request for the automatic parking.

In one implementation, the steering information may include information on a target steering angle for moving to the parking space, a current steering angle, and an average steering speed of the vehicle, and the automatic parking controller may calculate the fourth progress based on a time it takes for the current steering angle to reach the target steering angle of the vehicle.

In one implementation, the shift information may include information on a target speed for reaching the parking space, a shift request time, and a shift completion time, and the automatic parking controller may calculate the fourth progress based on the shift request time and the shift completion time.

In one implementation, the torque information may include information on a target torque for overcoming the road surface resistance, information on a current torque, and information on an average torque increase speed, and the automatic parking controller may calculate the fourth progress based on a time it takes for the current torque to reach the target torque.

In one implementation, the environment information may include information on a road surface resistance, and the automatic parking controller may calculate the fifth progress based on a time it takes for the vehicle to overcome the road surface resistance based on the control information.

In one implementation, when the vehicle does not overcome the road surface resistance based on the control information, the automatic parking controller may calculate additional control information for the behavior controller based on the environment information, and calculate the fifth progress based on the time it takes to overcome the road surface resistance based on the additional control information.

In one implementation, the environment information may include information on a parking route and GPS information on a vehicle location, and the automatic parking controller may calculate the first progress, the second progress, the third progress, the fourth progress, and the fifth progress using the information on the parking route and the GPS information on the vehicle location.

According to another embodiment of the present disclosure, a method for controlling automatic parking of a vehicle includes collecting, by a collecting device, environment information and a user input for the automatic parking of the vehicle, determining, by an automatic parking controller, whether the user input is a wake-up request, calculating a first progress corresponding to the determination, acquiring, by the automatic parking controller, a control right for a behavior controller based on the user input, calculating a second progress corresponding to the acquisition of the control right, determining, by the automatic parking controller, whether the user input is an execution request for the automatic parking, calculating a third progress corresponding to the determination on whether the user input is the execution request for the automatic parking, generating, by the automatic parking controller, control information for the behavior controller based on the environment information, calculating a fourth progress corresponding to the generation of the control information, controlling, by the automatic parking controller, a behavior of the vehicle based on the control information, and calculating a fifth progress corresponding to the control of the behavior of the vehicle.

In one implementation, the method may further include outputting, by an output device included in the vehicle, information corresponding respectively to the first progress, the second progress, the third progress, the fourth progress, and the fifth progress.

In one implementation, the collecting device may include an input device, and the method may include collecting, by the collecting device, the user input through the input device, determining, by the automatic parking controller, that the user input is the wake-up request when the user input is maintained for a first wake-up time or longer, and calculating, by the automatic parking controller, the first progress when the user input is determined to be the wake-up request.

In one implementation, the method may further include collecting, by the collecting device, the environment information for the automatic parking including information on a location of a user, receiving, by a communication device included in the vehicle, an input signal from an external terminal, collecting, by the collecting device, the user input based on the input signal, determining, by the automatic parking controller, the user input as the wake-up request when the location of the user is outside the vehicle and the user input based on the input signal is maintained for a second wake-up time or longer, and calculating, by the automatic parking controller, the first progress when the user input is determined to be the wake-up request.

In one implementation, the external terminal may include a terminal output device that outputs information corresponding respectively to the first progress, the second progress, the third progress, the fourth progress, and the fifth progress, and the method may include transmitting, by the automatic parking controller, the information corresponding respectively to the first progress, the second progress, the third progress, the fourth progress, and the fifth progress to the external terminal through the communication device, and outputting, by the terminal output device included in the external terminal, the information corresponding respectively to the first progress, the second progress, the third progress, the fourth progress, and the fifth progress.

BRIEF DESCRIPTION OF THE DRAWINGS

The above and other objects, features and advantages of embodiments of the present disclosure will be more apparent from the following detailed description taken in conjunction with the accompanying drawings, in which.

DETAILED DESCRIPTION OF ILLUSTRATIVE EMBODIMENTS

Figure 1:
FIG. 1 illustrates a vehicle and an external terminal according to an embodiment of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiments of the present disclosure, a detailed description of well-known features or functions will be omitted in order not to unnecessarily obscure the gist of the present disclosure.

In describing the components of the embodiments according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 illustrates a vehicle 10 and an external terminal 600 according to an embodiment of the present disclosure.

As shown in FIG. 1, the vehicle 10 that performs an automatic parking function may communicate with the external terminal 600. The vehicle 10 may perform the automatic parking function based on surrounding environment information and a user input. The vehicle 10 may collect the user input directly or based on an input signal received through the external terminal 600.

In addition, the vehicle 10 may transmit and receive signals with the external terminal 600 through a short-range communication technology. The short-range communication technology may use Bluetooth communication or infrared communication as an example.

The external terminal 600 may mean a wireless communication device portable by a user. The external terminal 600 may be implemented as a smart key, a display smart key, a smart phone, a tablet, a personal digital assistant (PDA), a portable multimedia player (PMP), a laptop computer, and/or the like.

The external terminal 600 may include a separate external input device (not shown). The external input device (not shown) may be implemented as a key pad, a button, a touch pad, a jog wheel, a jog switch, a toggle switch, or the like. A form of the external input device (not shown) is not limited as long as the external input device is a device capable of receiving the user input.

For example, when the external terminal 600 is the smart key, the external terminal 600 may include the external input device (not shown) in the form of the button, and the user may input a forward movement signal or a backward movement signal through the button. The external terminal 600 may transmit the input signal to the vehicle 10.

In addition, the external terminal 600 may receive information corresponding to a progress from the vehicle 10. The external terminal 600 may provide the received information to the user through a terminal output device. The terminal output device may include at least one of a display, an audio output device, and/or a haptic module, and may not be limited to the above examples as long as the terminal output device is a device capable of providing the information corresponding to progress to the user.

Figure 2:
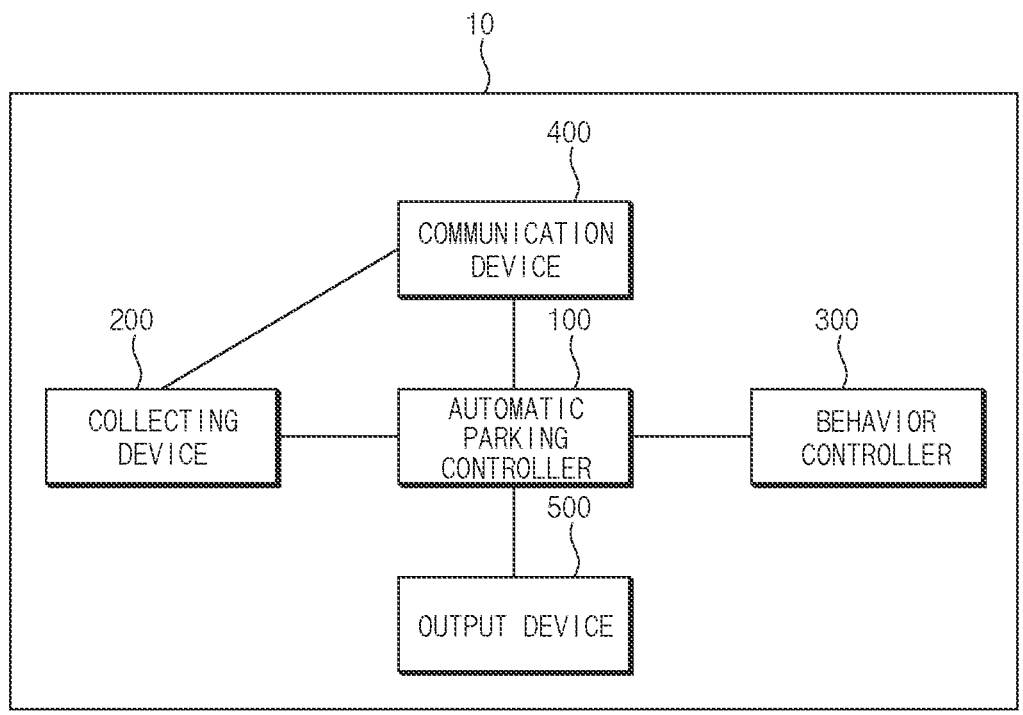
FIG. 2 illustrates a configuration of a vehicle according to an embodiment of the present disclosure.

FIG. 2 illustrates a configuration of the vehicle 10 according to an embodiment of the present disclosure.

The vehicle 10 may include an automatic parking controller 100 that performs automatic parking based on the surrounding environment information and the user input, and performs a process for the automatic parking, a collecting device 200 that collects the surrounding environment information of the vehicle 10 and the user input to perform the automatic parking, a behavior controller 300 that controls a behavior of the vehicle 10 in response to control of the automatic parking controller 100, a communication device 400 that performs the communication by accessing the external terminal 600 or an external communication network, and an output device 500 that receives a progress corresponding to the process for performing the automatic parking from the automatic parking controller 100 and outputs information corresponding to the progress.

The process for the automatic parking may include all of a process in which the automatic parking controller 100 determines whether the user input is an execution request for the automatic parking function, a process of acquiring a control right for each component (e.g., the behavior controller 300 or the like) of the vehicle 10, a process of generating control information, and a process of controlling the behavior of the vehicle 10.

The automatic parking function may refer to a function in which the vehicle 10 is parked by itself based on the surrounding environment information even when the user does not directly drive the vehicle 10 or the user does not adjust steering, shift, and a torque of the vehicle 10.

The automatic parking controller 100 may perform the automatic parking of the vehicle based on the environment information and the user input for the automatic parking. In addition, the automatic parking controller 100 may calculate the progress corresponding to the process for automatic parking.

For example, the automatic parking controller 100 may perform the process of determining whether the user input is the automatic parking execution request based on the environment information and the user input collected through the collecting device 200, and may calculate the progress corresponding to the process.

In addition, the automatic parking controller 100 may perform the process of generating the control information for the behavior controller 300 based on the environment information and calculate the progress corresponding to the process.

The automatic parking controller 100 may control the output device 500 to output the information corresponding to the progress. The user may intuitively determine whether the automatic parking function is properly performed through the progress output through the output device 500, and may recognize an estimated time required.

The collecting device 200 may collect the environment information and the user input for the automatic parking. The environment information for the automatic parking may include information (e.g., a width of the parking space, a location from the vehicle 10, and the like) on a parking space for parking the vehicle 10, information (e.g., other vehicles, pedestrians, terrain features, or the like) on an obstacle adjacent to a parking location or a parking route, road surface information (e.g., a resistance of a road surface, a material of the road surface, and the like) of the parking route, and the like.

The collecting device 200 may include a distance measurement sensor (an ultrasonic sensor, a radar, and the like), an image sensor (a camera and the like), an acceleration sensor, a yaw rate sensor, a wheel speed sensor, a steering angle sensor, a distance sensor, and the like to collect the environment information.

The ultrasonic sensor, the radar, the camera, and the like are respectively mounted in a front portion, a rear portion, a left portion, and a right portion of the vehicle 10 to obtain environment information on the front, the rear, the left, and the right portions of the vehicle 10.

The information on the obstacle may include information such as a size of the obstacle, a distance between the obstacle and the vehicle 10, a location of the obstacle, a speed and an acceleration of the obstacle, and the like.

In addition, the environment information for the automatic parking may include information on a location of the user. The collecting device 200 may collect the environment information including the information on the location of the user when the input signal is collected from the external terminal 600. The information on the location of the user may be collected by the distance measurement sensor (the ultrasonic sensor, the radar, and the like), the image sensor (the camera and the like), and the like described above.

The collecting device 200 may include an input device. The collecting device 200 may collect the user input through the input device. The input device may include a switch, a touch device, or the like disposed in the vehicle 10, and specifically, may be implemented as a key pad, a button, a touch pad, a jog wheel, a jog switch, a toggle switch, or the like. A form of the input device is not limited as long as the input device is able to receive the user input.

The collecting device 200 may collect the user input based on the input signal received from the external terminal 600. The collecting device 200 may receive the input signal through the communication device 400.

The collecting device 200 may collect information corresponding to an input start time, an input duration time, an input end time, and the like of the user input.

The behavior controller 300 may be a component that controls the behavior of the vehicle 10. The behavior of the vehicle 10 may collectively refer to stopping and moving of the vehicle 10 such as braking, driving, steering, shifting, and the like of the vehicle 10.

The automatic parking controller 100 acquires a control right for the behavior controller 300 based on the user input, so that the vehicle may be parked or unparked by the automatic parking controller 100 even when the user does not directly control the vehicle 10.

The communication device 400 may refer to a hardware device implemented with various electronic circuits to transmit and receive the signals through wireless or wired connection.

The automatic parking controller 100 according to an embodiment of the present disclosure may perform wireless communication with the external terminal 600 through the communication device 400.

The wireless communication between the external terminal 600 and the communication device 400 may be implemented using wireless Internet technologies such as a wireless LAN (WLAN) (WiFi), a wireless broadband (Wibro), and/or a world interoperability for microwave access (Wimax), short-range communication technologies such as a Bluetooth, a near field communication (NFC), a radio frequency identification (RFID), a RF communication, and/or a low frequency (LF) communication, and/or mobile communication technologies such as a code division multiple access (CDMA), a global system for mobile communication (GSM), a long term evolution (LTE), and/or LTE-Advanced, and the like as an example.

According to an embodiment of the present disclosure, the collecting device 200 may collect the user input based on the input signal received from the external terminal 600 through the communication device 400. In addition, when the user input is collected based on the input signal received from the external terminal 600, the automatic parking controller 100 may deliver the information corresponding to the progress to the external terminal 600 through the communication device 400. The external terminal 600 that has received the information corresponding to the progress may output the information corresponding to the progress.

The output device 500 may output the information corresponding to the progress to the user. The output device 500 may output the information corresponding to the progress through output means corresponding to a visual, auditory, or tactile method.

Figure 3:
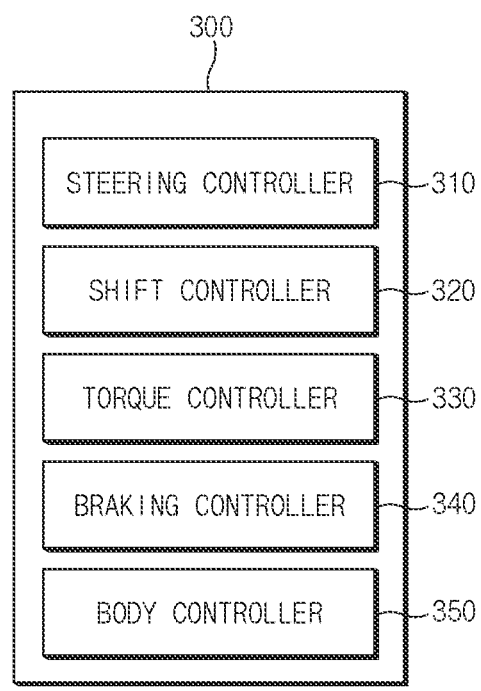
FIG. 3 illustrates a configuration of a behavior controller according to an embodiment of the present disclosure.

FIG. 3 illustrates a configuration of the behavior controller 300 according to an embodiment of the present disclosure.

The behavior controller 300 may include a steering controller 310 that controls a steering device to adjust a direction of the vehicle 10, a shift controller 320 that controls a shift device to control the shifting of the vehicle 10, a torque controller 330 that controls a driving device to control a driving torque of the vehicle 10, a braking controller 340 that controls a braking device to control the braking of the vehicle 10, and a body controller 350 that controls an electronic device included in the vehicle 10.

The steering device may include, for example, a steering wheel. The shift device may include, for example, a transmission. The driving device may include, for example, an engine, a motor, or the like. The braking device may include a brake. The electronic device may include, for example, a body control module that controls a lamp, a door unit of the vehicle, or the like included in the vehicle 10.

Each controller is a general in-vehicle device for performing the parking of the vehicle 10, so that a detailed description thereof will be omitted.

Figure 4:
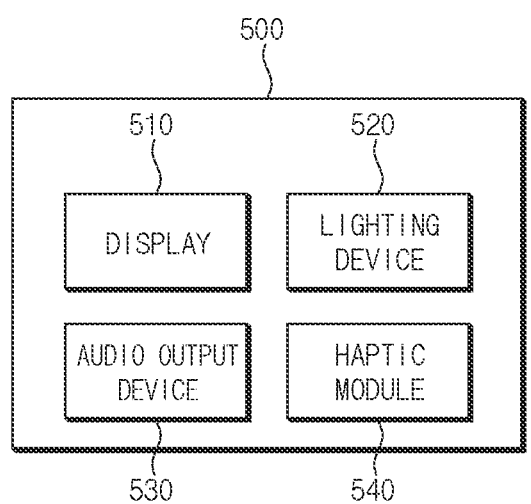
FIG. 4 is an exemplary view illustrating an output device of a vehicle according to an embodiment of the present disclosure.

FIG. 4 is an exemplary view illustrating the output device 500 of the vehicle 10 according to an embodiment of the present disclosure.

The vehicle 10 may easily deliver the information corresponding to the progress to the user through the output device 500.

The output device 500 may include a display 510, a lighting device 520, an audio output device 530, and a haptic module 540.

The display 510 may refer to a display included in a vehicle instrument panel (a cluster), head up display, and an audio, video, navigation system (AVN system) included in the vehicle, and may include, for example, at least one of a liquid crystal display, a thin film transistor liquid crystal display, an organic thin film display, and/or a flexible display.

The display 510 may visually indicate the information corresponding to the progress. For example, the display 510 may visually indicate a current progress with respect to an entire progress by indicating the information corresponding to the progress in a form of a progress bar.

The display 510 may easily deliver the information corresponding to the progress to the user, especially when the user is inside the vehicle 10. The case in which the user is inside the vehicle 10 may be a case in which the collecting device 200 collects the user input through the input device.

The lighting device 520 may include at least one of interior lighting (e.g., ambient lighting and the like) and/or exterior lighting (e.g., lamp light) included in the vehicle.

The lighting device 520 may visually indicate the information corresponding to the progress. For example, when the lighting device 520 is the internal ambient lighting, the lighting device 520 may visually deliver the information corresponding to the progress to the user in a method such as changing a color of the ambient lighting or changing a blinking period in response to a change in the progress.

When the lighting device 520 is the internal ambient lighting, the vehicle 10 may easily deliver the progress to the user inside the vehicle.

In addition, when the lighting device 520 is the exterior lighting, the lighting device 520 may deliver the change in the progress to the user outside the vehicle 10. As an example, the exterior lighting may visually deliver the progress to the user in a method of projecting an image corresponding to the progress using a spot lamp and the like, or changing a blinking period, a blinking color, and the like of the external lamp of the vehicle.

The audio output device 530 may include at least one of an internal audio device (e.g., an internal speaker and the like) and/or an external speaker (e.g., a buzzer and the like) included in the vehicle.

The audio output device 530 may audibly indicate the information corresponding to the progress. For example, when the audio output device 530 is the internal speaker, the audio output device 530 may broadcast the progress to audibly deliver the information corresponding to the progress to the user.

When the audio output device 530 is the internal speaker, the vehicle 10 may easily deliver the progress to the user inside the vehicle.

In addition, when the audio output device 530 is the external speaker, the audio output device 530 may deliver the change in the progress to the user outside the vehicle 10. As an example, the audio output device 530 may broadcast a sound corresponding to the progress to the outside using the buzzer that outputs the sound to the outside.

The haptic module 540 may include a vibrator. The vibrator may allow the user to perceive the signal tactilely.

In other words, the haptic module 540 may tactilely indicate the information corresponding to the progress. The haptic module 540 may easily deliver the information corresponding to the progress when the user is inside the vehicle 10.

For example, the haptic module 540 may haptically deliver the progress to the user by changing a vibration period, a vibration intensity, and the like based on the progress.

Figure 5:
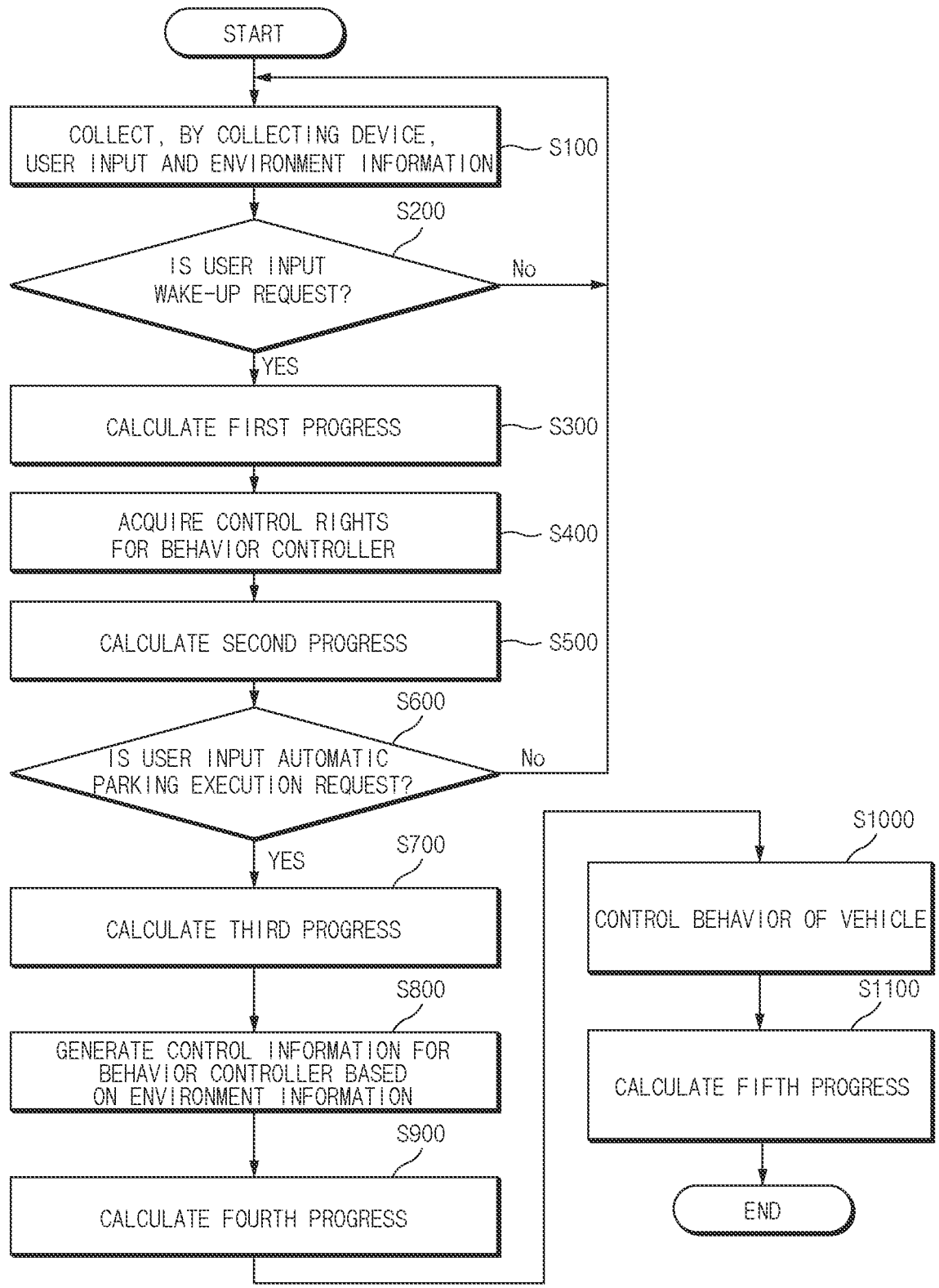
FIG. 5 is a flowchart illustrating a method for calculating a progress of a vehicle according to an embodiment of the present disclosure.

FIG. 5 is a flowchart illustrating a method for calculating a progress of the vehicle 10 according to an embodiment of the present disclosure.

The collecting device 200 may collect the user input and the environment information to perform the automatic parking (S100).

In an embodiment of the present disclosure, the collecting device 200 may collect the user input through the input device included in the vehicle 10.

In another embodiment of the present disclosure, the collecting device 200 may collect the user input based on the input signal through the external terminal 600. The external terminal 600 may transmit the input signal to the collecting device 200 through the short-range communication technology (e.g., the Bluetooth communication or the infrared communication).

The automatic parking controller 100 may perform the process for the automatic parking of the vehicle 10 based on the environment information and the user input.

The automatic parking controller 100 may determine whether the user input is a wake-up request (S200).

The wake-up request may mean a request for activating a control process by the automatic parking controller 100. The automatic parking controller 100 may perform other processes for the automatic parking after the wake-up request determination process.

In an embodiment of the present disclosure, when the collecting device 200 collects the user input through the input device, the automatic parking controller 100 may determine the wake-up request based on the duration time of the user input. When the user input is collected through the input device and lasts for a first wake-up time or longer, the automatic parking controller 100 may determine the user input as the wake-up request.

In another embodiment of the present disclosure, when the collecting device 200 collects the user input based on the input signal of the external terminal 600, the automatic parking controller 100 may determine the wake-up request based on the location information of the user and the duration time of the user input. When the user location is outside the vehicle and the user input lasts for a second wake-up time or longer, the automatic parking controller 100 may determine the user input based on the input signal as the wake-up request.

When the input signal through the external terminal 600 lasts for a preset time or longer, the user input based on the input signal collected through the collecting device 200 may last for the preset time or longer.

According to another embodiment of the present disclosure, when the collecting device 200 collects the user input based on the input signal of the external terminal 600, the wake-up request determination process by the automatic parking controller 100 may include determination of a remote control request.

When the user input is not the wake-up request, the automatic parking controller 100 may collect the user input and the environment information again through the collecting device 200 (a NO path of S200).

When the user input is the wake-up request, the process for controlling the vehicle 10 by the automatic parking controller 100 may be activated. In addition, the automatic parking controller 100 may calculate a first progress corresponding to the wake-up request determination process (S300).

The first progress may refer to a progress corresponding to the process of determining whether the user input is the wake-up request associated with the automatic parking controller 100.

When a total progress for performing the automatic parking function is 100%, the automatic parking controller 100 may represent a progress corresponding to each process in a percentage.

With respect to the total progress, a percentage of the first progress may vary based on an embodiment.

According to an embodiment of the present disclosure, when the collecting device 200 collects the user input through the input device, the percentage of the first progress to the total progress may be 4%.

According to another embodiment of the present disclosure, when the collecting device 200 collects the user input based on the input signal of the external terminal 600, because the wake-up request determination process includes the determination on the remote control request, the percentage of the first progress to the total progress may be larger than that in the above-described embodiment. The percentage of the first progress according to another embodiment of the present disclosure may be 10%.

When the user input lasts for an automatic control activation time or longer, the automatic parking controller 100 may acquire the control right for the behavior controller 300 (S400).

The automatic control activation time may be a user input duration time for the automatic parking controller 100 to initiate the acquiring of the control right for the behavior controller 300.

The automatic control activation time may be the same time as the first wake-up time or the second wake-up time.

According to an embodiment of the present disclosure, when the user input through the input device lasts for the preset time (the automatic control activation time or the first wake-up time) or longer, the automatic parking controller 100 may initiate the process of acquiring the control right for the behavior controller 300.

According to another embodiment of the present disclosure, when the input signal through the external terminal 600 lasts for the preset time (the automatic control activation time or the second wake-up time) or longer, the automatic parking controller 100 may initiate the process of acquiring the control right for the behavior controller 300.

The control right acquisition process for the behavior controller 300 may refer to a process of acquiring, by the automatic parking controller 100, control rights for the controllers (e.g., the steering controller 310, the shift controller 320, the torque controller 330, the braking controller 340, and the body controller 350) included in the behavior controller 300.

As the automatic parking controller 100 acquires the control right for the behavior controller 300, the parking and the unparking of the vehicle 10 may be performed without user intervention. In other words, the automatic parking controller 100 may perform the automatic parking function without separate manipulation of the user by acquiring the control right for the behavior controller 300.

The automatic parking controller 100 may calculate the second progress corresponding to the control right acquisition process for the behavior controller 300 (S500).

The second progress may increase as the automatic parking controller 100 acquires the control rights for the controllers (e.g., the steering controller 310, the shift controller 320, the torque controller 330, the braking controller 340, and the body controller 350) included in the behavior controller 300.

As an example, as the automatic parking controller 100 acquires the control rights for the steering controller 310, the shift controller 320, the torque controller 330, the braking controller 340, and the body controller 350, the automatic parking controller 100 may increase the second progress by 1.2% for the total progress. In other words, the second progress may be 6% with respect to the total progress.

The automatic parking controller 100 may determine whether the user input is the automatic parking execution request (S600).

The automatic parking controller 100 may determine whether the user input is the automatic parking execution request based on the duration time of the user input.

When the user input lasts for an automatic parking request time or longer, the automatic parking controller 100 may determine the user input as the automatic parking execution request.

According to an embodiment of the present disclosure, when the user input through the input device lasts for the preset time (the automatic parking request time) or longer, the automatic parking controller 100 may determine that the user input is the execution request for the automatic parking.

According to another embodiment of the present disclosure, when the input signal through the external terminal 600 lasts for the preset time (the automatic parking request time) or longer, and when the user input based on the input signal lasts for the preset time or longer, the automatic parking controller 100 may determine that the user input is the execution request for the automatic parking.

When the user input is not the execution request for the automatic parking (a NO path of S600), the automatic parking controller 100 may collect the user input and the environment information again through the collecting device 200.

When the user input lasts for the preset time or longer, the automatic parking controller 100 may determine that the user input is not an incorrect input or a malicious input of the user.

When the user input lasts for the preset time or longer, the automatic parking controller 100 may determine that the user has an intention to execute the automatic parking function.

The automatic parking controller 100 of embodiments of the present disclosure may prevent execution of the automatic parking function resulted from the incorrect input by determining the intention of the user to execute the automatic parking function.

When determining the user input as the automatic parking execution request, the automatic parking controller 100 may calculate a third progress corresponding to the process of determining whether the user input is the automatic parking execution request (S700).

With respect to the total progress, a percentage of the third progress may vary based on an embodiment.

According to an embodiment of the present disclosure, when the collecting device 200 collects the user input through the input device, the percentage of the third progress may be 10%.

According to another embodiment of the present disclosure, when the collecting device 200 collects the user input based on the input signal of the external terminal 600, the percentage of the third progress may be 4%.

After calculating the third progress, the automatic parking controller 100 may generate the control information for the behavior controller 300 based on the environment information collected through the collecting device 200 (S800).

The environment information may include surroundings information for the vehicle 10 to perform the automatic parking. The environment information may include the information (e.g., the width of the parking space, the location from the vehicle 10, and the like) on the parking space for parking the vehicle 10, the information (e.g., the other vehicles, the pedestrians, the terrain features, or the like around) on the obstacle adjacent to the parking location or the parking route, the road surface information (e.g., the resistance of the road surface, the material of the road surface, and the like) of the parking route, and the like, as an example.

The information on the obstacle may include the information such as the size of the obstacle, the distance between the obstacle and the vehicle 10, the location of the obstacle, the speed and the acceleration of the obstacle, and the like.

The automatic parking controller 100 may generate control information for the controllers (e.g., the steering controller 310, the shift controller 320, the torque controller 330, the braking controller 340, and the body controller 350) included in the behavior controller 300 based on the environment information.

The control information for the controllers may include information required before performing the automatic parking function and information required during the automatic parking function of the controllers (e.g., the steering controller 310, the shift controller 320, the torque controller 330, the braking controller 340, and the body controller 350).

For example, the control information for the behavior controller 300 may include steering information for a behavior direction of the vehicle 10, shift information for controlling a moving speed of the vehicle 10, and torque information for the vehicle 10 to overcome the road resistance.

The automatic parking controller 100 may calculate a fourth progress corresponding to whether the control information for the behavior controller is generated based on the environment information (S900).

The fourth progress may be a sum of progresses corresponding respectively to calculation processes for the steering information, the shift information, and the torque information. According to an embodiment, the fourth progress may be 30% with respect to the total progress.

The automatic parking controller 100 may control the behavior of the vehicle 10 based on the control information (S1000).

The behavior control of the vehicle 10 may refer to moving the vehicle 10 such that the vehicle 10 performs the automatic parking, and the behavior of the vehicle 10 may include all of the moving direction and the speed of the vehicle 10.

The automatic parking controller 100 may calculate a fifth progress based on an actual time it takes for the vehicle 10 to act (S1100).

The vehicle 10 should be able to overcome the resistance of the road surface on which the vehicle 10 is located to move in response to the control of the automatic parking controller 100. When the vehicle 10 overcomes the road surface resistance and begins to move, the user may recognize that the automatic parking function is being executed. Therefore, when the vehicle 10 moves, a progress may be 100%.

Figure 6:
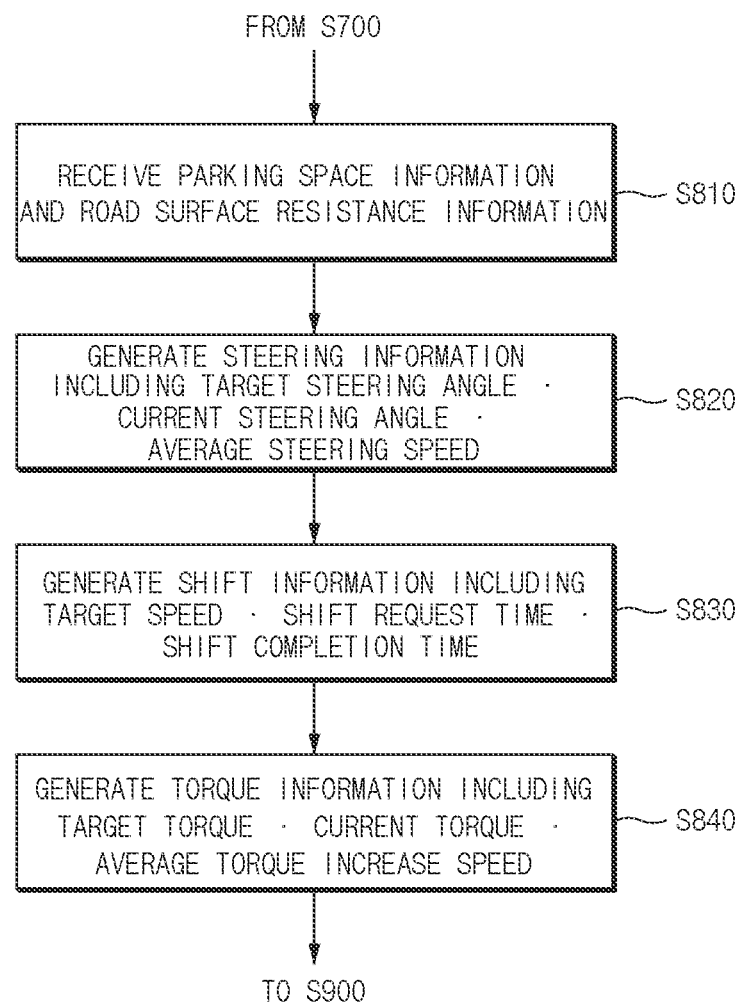
FIG. 6 is a flowchart of a method for generating control information and a method for calculating a fourth progress by an automatic parking controller.

FIG. 6 is a flowchart of a method for generating control information and a method for calculating a fourth progress by the automatic parking controller 100.

The automatic parking controller 100 may receive the environment information including the parking space information and the road surface resistance information from the collecting device 200 (S810).

The environment information may include the information (e.g., the width of the parking space, the location from the vehicle 10, and the like) on the parking space for parking the vehicle 10, the information (e.g., the other vehicles, the pedestrians) of an obstacle, the road surface information (e.g., the resistance of the road surface, the material of the road surface, and the like) of the parking route, and the like, as an example.

The automatic parking controller 100 may generate the control information for the controllers (e.g., the steering controller 310, the shift controller 320, the torque controller 330, the braking controller 340, and the body controller 350) included in the behavior controller 300 based on the environment information.

The automatic parking controller 100 may control the controllers (e.g., the steering controller 310, the shift controller 320, the torque controller 330, the braking controller 340, and the body controller 350) included in the behavior controller 300 based on the generated control information.

The automatic parking controller 100 may control the steering controller 310 based on the steering information. By controlling the steering controller 310, the automatic parking controller 100 may control the moving direction of the vehicle 10.

The steering information may be generated based on the parking space information included in the environment information. The automatic parking controller 100 may generate the steering information in consideration of the parking space information, current location information of the vehicle 10, the location of the surrounding obstacle, and the like. The steering information may include a target steering angle of the vehicle for moving to the parking space, a current steering angle, and an average steering speed of the vehicle (S820).

The automatic parking controller 100 may calculate a time for reaching the target steering angle of the vehicle based on the target steering angle of the vehicle, the current steering angle, and the average steering speed of the vehicle.

The automatic parking controller 100 may calculate a fourth progress corresponding to the steering information calculation process based on the time it takes to reach the target steering angle. According to an embodiment, the progress corresponding to the steering information calculation process may be 10% with respect to the total progress.

The automatic parking controller 100 may control the shift controller 320 based on the shift information. By controlling the shift controller 320, the automatic parking controller 100 may control the moving speed and a gear ratio of the vehicle 10.

The shift information may be generated based on the parking space information included in the environment information. The automatic parking controller 100 may generate the shift information in consideration of the parking space information, the current location information of the vehicle 10, the location of the surrounding obstacle, and the like. The shift information may include information on a target speed of the vehicle for moving to the parking space, a shift request time, and a shift completion time (S830).

The automatic parking controller 100 may calculate a time it takes for gear shift of the vehicle based on the shift request time and the shift completion time of the vehicle.

The automatic parking controller 100 may calculate a fourth progress corresponding to the shift information calculation process based on the shift request time and the shift completion time. According to an embodiment, the progress corresponding to the shift information calculation process may be 10% with respect to the total progress.

The automatic parking controller 100 may control the torque controller 330 based on the torque information. By controlling the torque controller 330, the automatic parking controller 100 may control the vehicle 10 to overcome the road surface resistance.

The torque information may be generated based on the road surface information included in the environment information. In particular, the road surface information may include friction force information for the road surface. The automatic parking controller 100 may generate the torque information in consideration of the road surface resistance information and information on torque output of the vehicle 10. The torque information may include information on a target torque for overcoming the road surface resistance, current torque information, and information on an average torque increase speed (S840).

The automatic parking controller 100 may calculate a time for reaching the target torque based on the target torque information, the current torque information, and the average torque increase speed.

The automatic parking controller 100 may calculate a fourth progress corresponding to the torque information calculation process based on a time it takes to reach the target torque. According to an embodiment, the progress corresponding to the torque information calculation process may be 10% with respect to the total progress.

The automatic parking controller 100 may calculate the fourth progress based on the sum of the progresses corresponding respectively to the generation processes for the steering information, the shift information, and the torque information.

An order of generating, by the automatic parking controller 100, the control information to control the controllers (the steering controller 310, the shift controller 320, and the torque controller 330) is not limited to the illustrated order. The automatic parking controller 100 may generate the shift information and then generate the steering information, or generate the torque information and then generate the steering information. In addition, the automatic parking controller 100 may simultaneously generate the control information (the steering information, the shift information, and the torque information).

Figure 7:
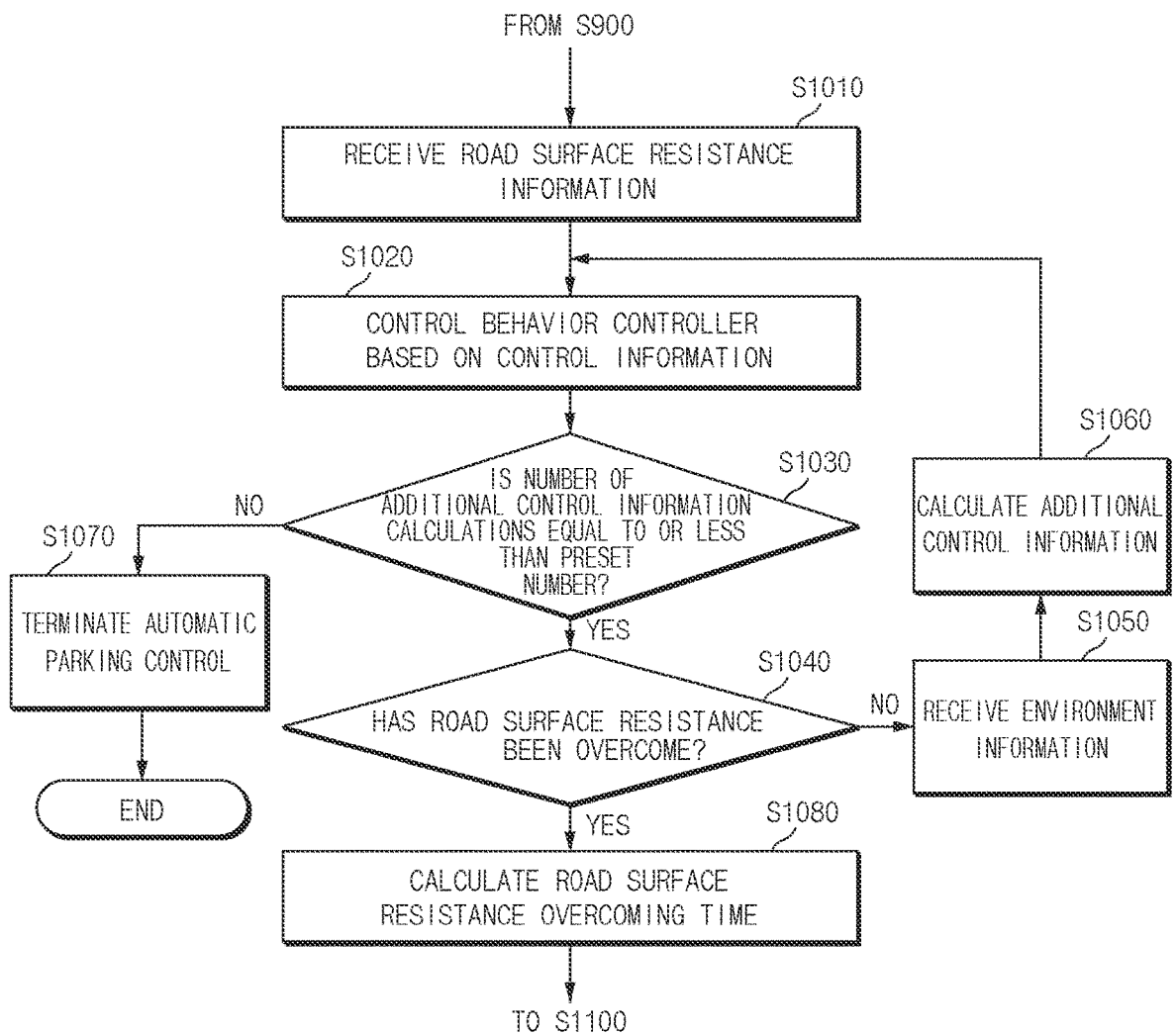
FIG. 7 is a flowchart of a method for controlling a behavior of a vehicle and a method for calculating a fifth progress by an automatic parking controller.

FIG. 7 is a flowchart of a method for controlling a behavior of the vehicle 10 and a method for calculating a fifth progress by the automatic parking controller 100.

The automatic parking controller 100 may receive the environment information including the information on the road surface resistance from the collecting device 200 (S1010).

The automatic parking controller 100 may control the behavior controller 300 based on the information on the road surface resistance and the control information (the steering information, the shift information, and the torque information) (S1020).

The behavior controller 300 may operate based on the control information. The behavior controller 300 includes the controllers (e.g., the steering controller 310, the shift controller 320, the torque controller 330, the braking controller 340, and the body controller 350) essential to the behavior of the vehicle, so that the automatic parking controller 100 may perform the automatic parking of the vehicle 10 by controlling the behavior controller.

The automatic parking controller 100 may determine whether the number of control information calculations for the control of the behavior controller 300 is equal to or less than a preset number (S1030).

When the number of additional control information calculations exceeds a preset number (a NO path of S1030), the automatic parking controller 100 may terminate the automatic parking control without determining whether the road surface resistance has been overcome.

When the automatic parking control is terminated, a progress value for the automatic parking control may become 0%, and vehicle 10 may notify of the termination of the automatic parking control through the output device 500.

When the number of additional control information calculations is equal to or less than a preset number of additional control information calculations (a YES path of S1030), the automatic parking controller 100 may determine whether the vehicle 10 overcomes the road surface resistance based on the generated control information or additional control information (S1040).

When the vehicle 10 overcomes the road surface resistance, the vehicle 10 may begin to move. The road surface resistance may vary depending on the material of the road surface, the slope, and the presence or the absence of the obstacle. For example, in a case of an environment without change in the slope and the obstacle, the automatic parking controller 100 may easily generate the control information.

When the vehicle 10 overcomes the road surface resistance (a YES path of S1040), the automatic parking controller 100 may calculate a time it takes for the vehicle to overcome the road surface resistance and move (S1080).

The automatic parking controller 100 may calculate the fifth progress based on the time it takes for the vehicle to overcome the road surface resistance and move.

According to an embodiment of the present disclosure, when there is no additional control information calculation by the automatic parking controller 100, the calculation of the fifth progress may be based on an average time it takes for the vehicle 10 to move in the absence of the change in the slope and the obstacle, and an actual time it takes for the vehicle 10 to move.

For example, the average time it takes for the vehicle 10 to move in the absence of the change in the slope and the obstacle may be 3300 ms (milliseconds).

When the actual time it takes for the vehicle 10 to move (the actual time it takes to overcome the road surface resistance) is equal to or less than 1800 ms, the automatic parking controller 100 may calculate the fifth progress through a value obtained by dividing the actual time it takes for the vehicle 10 to move by the average time.

The fifth progress may be 50% of the total progress, and the calculation of the fifth progress may follow the following equation:

$$\text{fifth progress}(\%) = (\text{time it takes to move (ms)})/$$
$$(3300 \text{ (average time it takes for vehicle to move, ms)}) * 50(\%)$$

When the vehicle 10 is not able to overcome the road surface resistance, the automatic parking controller 100 may receive the environment information again through the collecting device 200 (S1050).

The automatic parking controller 100 may calculate the additional control information based on the newly received environment information (S1060). The additional control information may include the steering information, the shift information, and the torque information like the control information calculated previously by the automatic parking controller 100.

In particular, the additional control information may include the torque information for overcoming the road surface resistance. When there is the obstacle such as a stopper or a curb on the road surface, or when the slope of the road surface changes, an additional torque may be required for the movement of the vehicle 10.

The automatic parking controller 100 may control the behavior controller 300 again based on the calculated additional control information when the additional torque is required.

When the vehicle 10 overcomes the road surface resistance based on the additional control information generated by the automatic parking controller 100 (a YES route of S1040), the automatic parking controller 100 may calculate the road surface resistance overcoming time (S1080). The automatic parking controller 100 may calculate the fifth progress based on the time it takes to overcome the road surface resistance.

Illustratively, when the automatic parking controller 100 calculates the additional control information, the automatic parking controller 100 may calculate the fifth progress based on a time it takes for the additional control information calculation, a maximum time it takes for the vehicle 10 to move, and the actual time it takes to move (the actual time it takes to overcome the road surface resistance).

When the preset number of additional control information calculations is one, the maximum time it takes for the vehicle 10 to move may be 9500 ms.

The time it takes for the automatic parking controller 100 to calculate the additional control information may be 1800 ms as an example.

When the additional control information is calculated once more, the fifth progress may be calculated as follows:

$$\text{fifth progress}(\%) = 1800(\text{time it takes for additional control information calculation,ms})/3300(\text{average time it takes for vehicle to move,ms})*50(\%) + (\text{time it takes to move} - 1800(\text{ms}))/(9500 - 1800(\text{maximum time it takes for vehicle to move} - 1800,\text{ms}))*(50 - (1800(\text{ms}))/(3300(\text{ms}))*50)(\%)$$

The automatic parking controller 100 may calculate the fifth progress and output the information corresponding to the fifth progress through the output device 500 or the external terminal 600, thereby delivering the progress of the process for the automatic parking.

Figure 8:
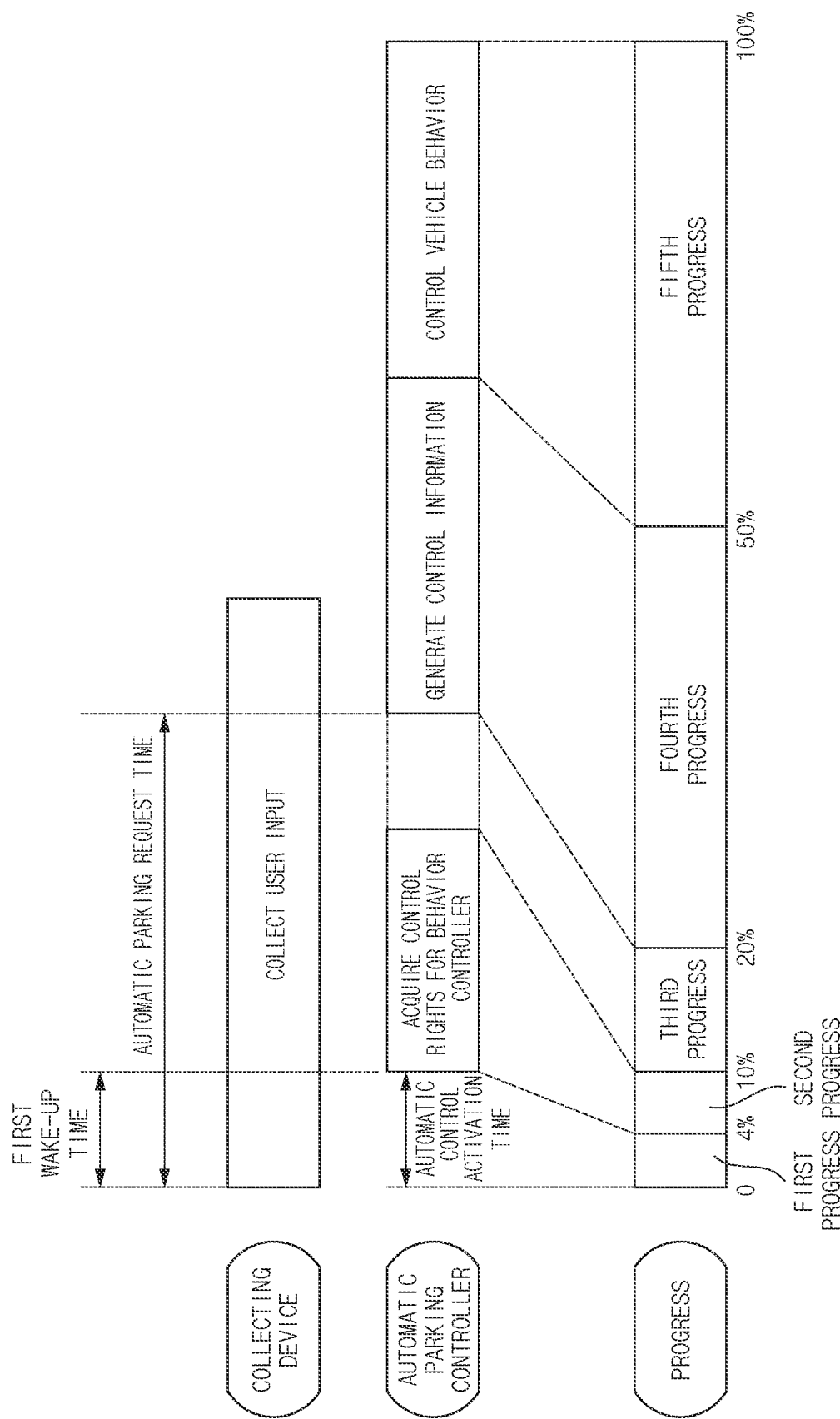
FIG. 8 illustrates operation methods of a collecting device and an automatic parking controller, and progresses thereof according to an embodiment of the present disclosure.

FIG. 8 illustrates operation methods of the collecting device 200 and the automatic parking controller 100, and progresses thereof according to an embodiment of the present disclosure.

Referring to FIG. 8, the processes for the automatic parking performed by the automatic parking controller 100 according to an embodiment of the present disclosure and the progresses corresponding respectively to the processes are illustrated.

According to the embodiment illustrated in FIG. 8, the collecting device 200 may collect user input through an input device.

When the collected user input lasts for the first wake-up time or longer, the automatic parking controller 100 may determine the user input as the wake-up request. When the user input is determined to be the wake-up request, the automatic parking controller 100 may calculate the first progress corresponding to the wake-up request determination. The first progress may be 4% with respect to the total progress (100%).

According to an embodiment, when the user input is determined to be the wake-up request, the automatic parking controller 100 may immediately increase the 4% corresponding to the first progress out of the total progress to allow the user to be aware of the progress of the process for the automatic parking.

When the user input lasts for the automatic control activation time or longer, the automatic parking controller 100 may acquire the control right for the behavior controller 300. The automatic control activation time may be the same as the first wake-up time.

The first wake-up time and the automatic control activation time may be 120 to 160 ms (milliseconds) as an example.

The automatic parking controller 100 may calculate the second progress corresponding to the process of acquiring the control rights for the controllers (the steering controller 310, the shift controller 320, the torque controller 330, the braking controller 340, and the body controller 350) included in the behavior controller 300. The second progress may be 6% with respect to the total progress (100%).

According to an embodiment, the automatic parking controller 100 may increase 1.2% of the total progress each time when the control right for each of the controllers (e.g., the steering controller 310, the shift controller 320, the torque controller 330, the braking controller 340, and the body controller 350) included in the behavior controller 300 is acquired to allow the user to be aware of the progress of the process for the automatic parking.

When the user input lasts for the automatic parking request time or longer, the automatic parking controller 100 may determine that the user input is the execution request for the automatic parking. In addition, the automatic parking controller 100 may calculate the third progress corresponding to the determination of the execution request for the automatic parking. The third progress may be 10% with respect to the total progress (100%).

According to an embodiment, as it is determined that the user input is the execution request for the automatic parking, the automatic parking controller 100 may immediately increase the 10% corresponding to the third progress out of the total progress to allow the user to be aware of the progress of the process for the automatic parking.

The automatic parking request time may be longer than the first wake-up time and the automatic control activation time. In addition, the automatic parking request time may be a time independent of a time it takes for the automatic parking controller 100 to acquire the control right for the behavior controller 300. The automatic parking request time may be 1000 ms as an example.

In other words, even when the control right for the behavior controller 300 is not acquired, the automatic parking controller 100 may generate the control information for the behavior controller 300 when the automatic parking request time has passed.

The automatic parking controller 100 may calculate the fourth progress corresponding to the process of generating the control information for the behavior controller 300. The control information for the behavior controller 300 may include the steering information for controlling the steering controller 310, the shift information for controlling the shift controller 320, and the torque information for controlling the torque controller 330.

The automatic parking controller 100 may calculate the fourth progress in response to the generation of each control information (the steering information, the shift information, and the torque information). The generation of control information may be performed independently. The fourth progress may be 30% with respect to the total progress of 100%.

According to an embodiment, the automatic parking controller 100 may increase 10% of the total progress each time when each control information is generated to allow the user to be aware of the progress of the process for the automatic parking.

The automatic parking controller 100 may control the behavior of the vehicle based on the generated control information. The automatic parking controller 100 may control the behavior of the vehicle 10 by controlling the behavior controller 300.

The automatic parking controller 100 may calculate the fifth progress corresponding to the behavior control process of the vehicle 10. The fifth progress may be 50% with respect to the total progress (100%).

The method for controlling the behavior of the vehicle 10 and the method for calculating the fifth progress may be substantially the same as described in FIG. 7 above. The automatic parking controller 100 may calculate the fifth progress based on the average time it takes for the vehicle to move, the maximum time it takes for the vehicle to move, the time it takes for the additional control information calculation, and the actual time it takes for the vehicle to move.

Figure 9:
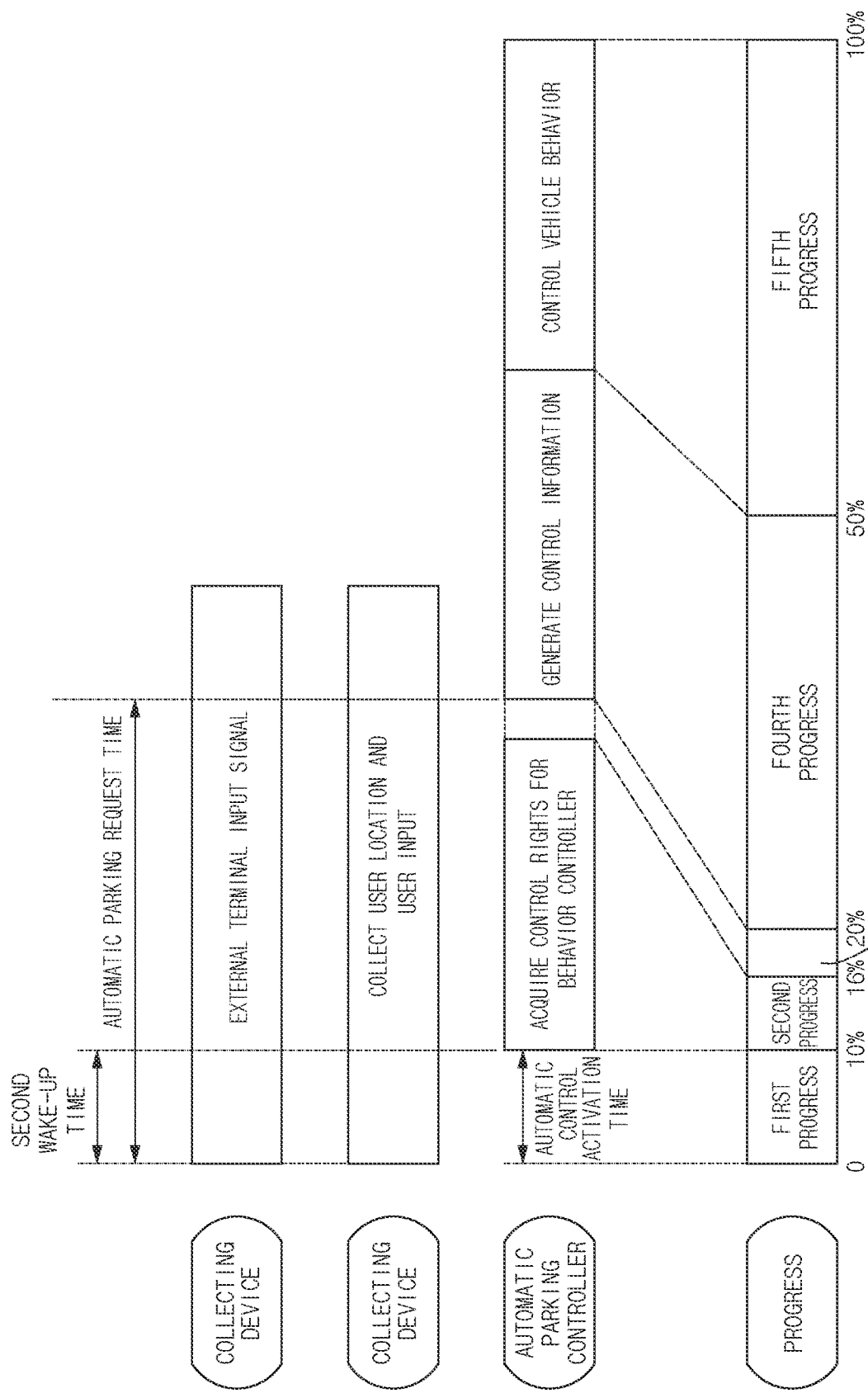
FIG. 9 illustrates operation methods of a collecting device, an automatic parking controller, and a communication device, and progresses corresponding thereto according to another embodiment of the present disclosure.

FIG. 9 illustrates operation methods of the collecting device 200, the automatic parking controller 100, and the communication device 400, and progresses corresponding thereto according to another embodiment of the present disclosure.

Referring to FIG. 9, the control processes performed by the automatic parking controller 100 according to an embodiment of the present disclosure and the progresses corresponding respectively to the processes are illustrated.

According to an embodiment illustrated in FIG. 9, the communication device 400 may receive the input signal from the external terminal 600. In addition, the collecting device 200 may collect the user input based on the input signal.

The collecting device 200 may collect not only the user input, but also the location information of the user. When the location of the user is the outside of the vehicle 10, the process of determining the wake-up request by the automatic parking controller 100 may include the determination on the remote control request.

The preset time for the automatic parking controller 100 to determine the user input through the collecting device 200 as the wake-up request may be referred to as the second wake-up time.

When the collected user input lasts for the second wake-up time or longer (when the input signal of the external terminal 600 lasts for the second wake-up time or longer), the automatic parking controller 100 may determine the user input as the wake-up request. When the user input is determined to be the wake-up request, the automatic parking controller 100 may calculate the first progress corresponding to the determination of the wake-up request. The first progress may be 10% with respect to the total progress (100%).

According to an embodiment, as it is determined that the user input is the wake-up request for the automatic parking controller 100, the automatic parking controller 100 may immediately increase the 10% corresponding to the first progress out of the total progress to allow the user to be aware of the progress of the process for the automatic parking.

When the user input lasts for the automatic control activation time or longer, the automatic parking controller 100 may acquire the control right for the behavior controller 300. The automatic control activation time may be the same as the second wake-up time.

The second wake-up time and the automatic control activation time may be 600 to 700 ms (milliseconds) as an example.

The automatic parking controller 100 may calculate the second progress corresponding to the process of acquiring the control rights for the controllers (the steering controller 310, the shift controller 320, the torque controller 330, the braking controller 340, and the body controller 350) included in the behavior controller 300. The second progress may be 6% with respect to the total progress (100%).

According to an embodiment, the automatic parking controller 100 may increase 1.2% of the total progress each time when the control right for each of the controllers (e.g., the steering controller 310, the shift controller 320, the torque controller 330, the braking controller 340, and the body controller 350) included in the behavior controller 300 is acquired to allow the user to be aware of the progress of the process for the automatic parking.

When the user input lasts for the automatic parking request time or longer, the automatic parking controller 100 may determine the user input based on the external input is the execution request for the automatic parking. In addition, the automatic parking controller 100 may calculate the third progress corresponding to the execution request for the automatic parking. The third progress may be 4% with respect to the total progress (100%).

According to an embodiment, when the user input is determined to be the execution request for the automatic parking, the automatic parking controller 100 may immediately increase the 4% corresponding to the third progress out of the total progress to allow the user to be aware of the progress of the process for the automatic parking.

The automatic parking request time may be longer than the first wake-up time and the automatic control activation time. In addition, the automatic parking request time may be the time independent of the time it takes for the automatic parking controller 100 to acquire the control right for the behavior controller 300. The automatic parking request time may be 1500 ms as an example.

In another embodiment of the present disclosure, the user input is based on the input signal through the external terminal 600, so that a time it takes to receive the input signal may vary depending on a distance between the external terminal 600 and the vehicle 10, the obstacle located around the vehicle 10, and the like.

In addition, even when the control right for the behavior controller 300 is not acquired, the automatic parking controller 100 may generate the control information for the behavior controller 300 when the automatic parking request time has passed.

The automatic parking controller 100 may calculate the fourth progress corresponding to the process of generating the control information for the behavior controller 300. A control information generation process and a method for calculating the fourth progress may be substantially the same as those described in FIG. 8. The fourth progress may be 30% with respect to the total progress of 100%.

According to an embodiment, the automatic parking controller 100 may increase 10% of the total progress each time when each control information is generated to allow the user to be aware of the progress of the process for the automatic parking.

The automatic parking controller 100 may control the behavior of the vehicle based on the generated control information. The automatic parking controller 100 may control the behavior of the vehicle 10 by controlling the behavior controller 300.

The automatic parking controller 100 may calculate the fifth progress corresponding to the behavior control process of the vehicle 10. The fifth progress may be 50% with respect to the total progress (100%). A method for controlling the behavior of the vehicle 10 and a method for calculating the fifth progress are substantially the same as those described above in FIGS. 7 and 8, so that redundant descriptions will be omitted.

Figure 10:
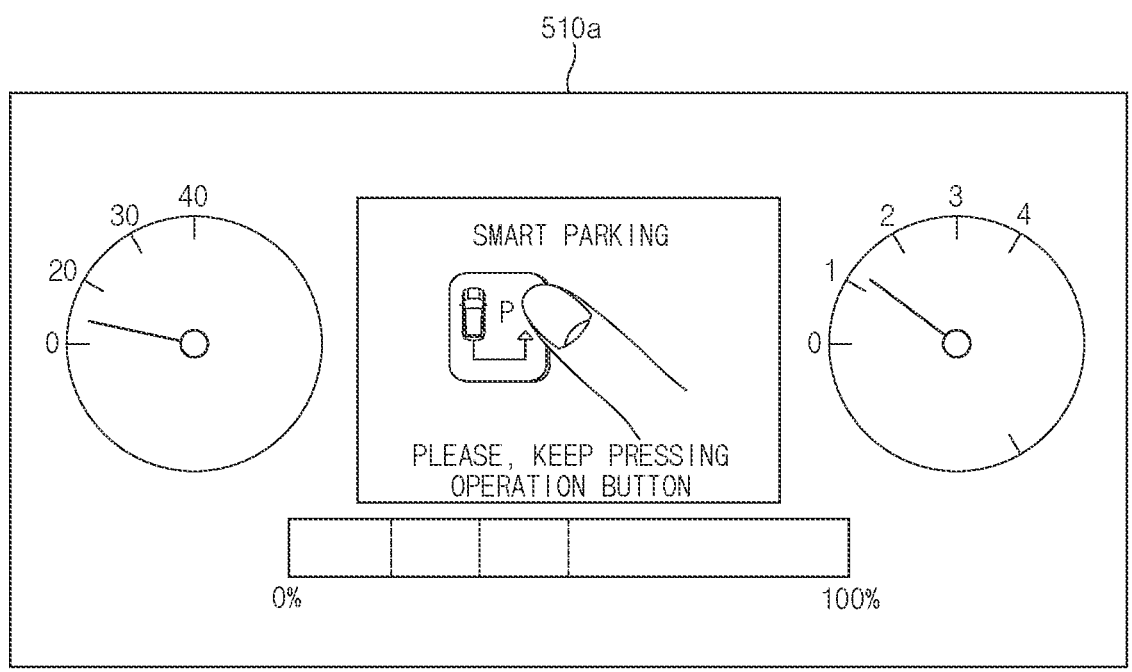
FIGS. 10 and 11 exemplarily illustrate progress indicating methods of a vehicle according to an embodiment of the present disclosure.
Figure 11:
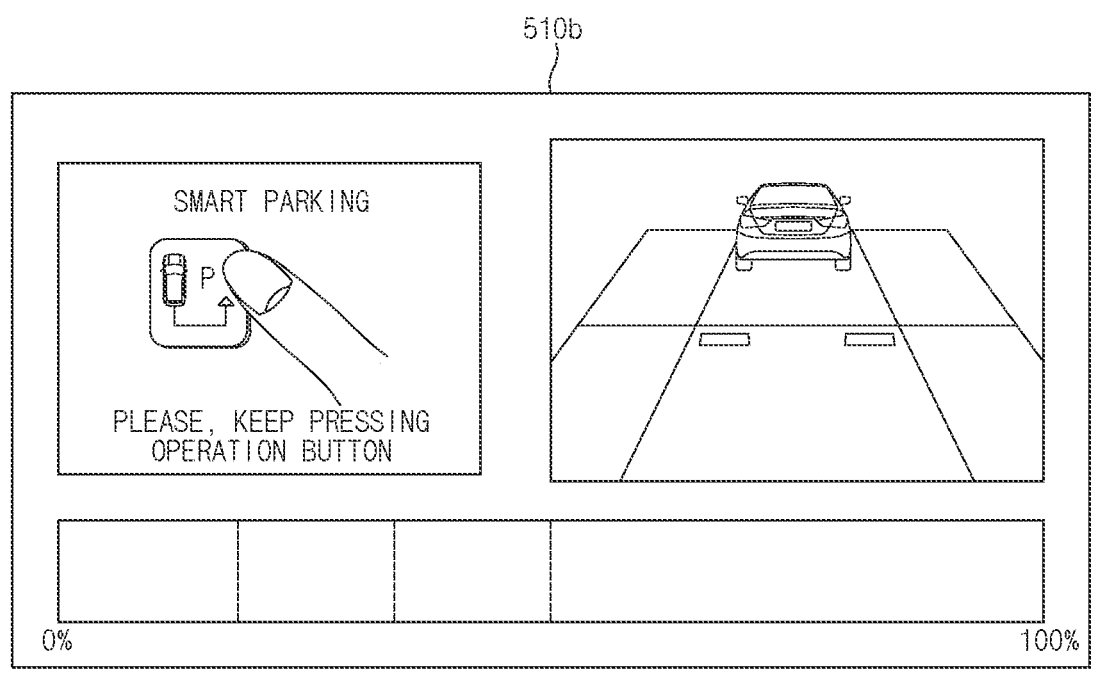

FIGS. 10 and 11 exemplarily illustrate progress indicating methods of the vehicle 10 according to an embodiment of the present disclosure.

FIG. 10 illustrates a method for indicating the progress through a vehicle instrument panel 510a among the displays 510 included in the output device 500.

As the progress is visually indicated through the vehicle instrument panel 510a, the user may intuitively recognize the progress of the process for the automatic parking.

In addition, the collecting device 200 may continuously collect the user input by guiding the user to keep pressing the input device (an input maintenance guide) through the vehicle instrument panel 510a.

When the user input does not last for the preset time (e.g., the first wake-up time, the second wake-up time, the automatic control activation time, or the automatic parking request time), the automatic parking controller 100 may not perform the process for the automatic parking. The automatic parking controller 100 may determine the intention of the user to execute the automatic parking function through the input maintenance guide, and may increase the perception of the user.

FIG. 11 illustrates a method for indicating the progress through an audio, video, navigation system display (AVN system display) 510b among the displays 510 included in the output device 500.

As the progress is visually indicated through the AVN system display 510b, the user may intuitively recognize the progress of the process for the automatic parking.

In addition, the collecting device 200 may continuously collect the user input by guiding the user to keep pressing the input device (the input maintenance guide) through the AVN system display 510b.

The AVN system display 510b may output a parking situation together such that the user may recognize an execution situation of the automatic parking function of the vehicle 10. For example, when the vehicle 10 performs a rear automatic parking function, the AVN system display 510b may indicate a rear parking situation.

The AVN system display 510b outputs a situation in which the vehicle 10 moves as the user input is maintained, so that the user may intuitively recognize whether the automatic parking function is well performed.

Figure 12:
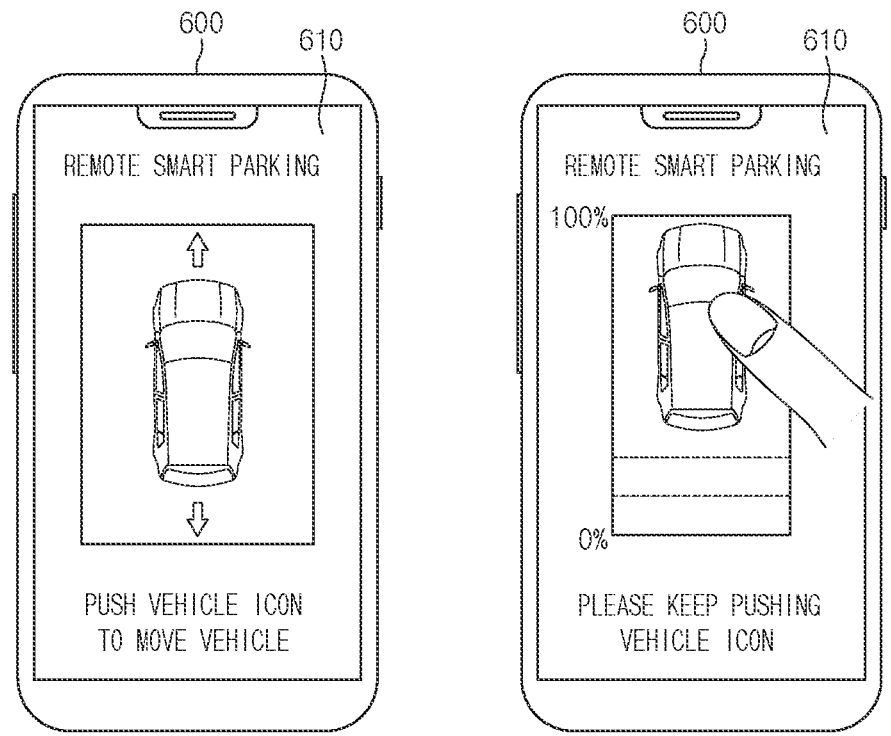
FIG. 12 illustrates a method for indicating a progress through an external terminal according to another embodiment of the present disclosure.

FIG. 12 illustrates a method for indicating a progress through the external terminal 600 according to another embodiment of the present disclosure.

The external terminal 600 may include a terminal output device 610, and the terminal output device 610 may include at least one of a display, a speaker, and/or a haptic module. FIG. 12 illustrates an embodiment in which the terminal output device 610 includes the display.

The terminal output device 610 may guide the user to maintain the input. As the user maintains the input, the input signal through the external terminal 600 may be maintained. The external terminal 600 may determine the intention of the user to execute the automatic parking function through the input maintenance guide.

The collecting device 200 of the vehicle 10 may collect the user input based on the input signal. In other words, when the user maintains the input for the external terminal 600, the user input may also be maintained.

The external terminal 600 may visually deliver the progress through the terminal output device 610. According to an embodiment, the terminal output device 610 of the external terminal 600 may be implemented as a touch screen. When the terminal output device 610 is the touch screen, the terminal output device 610 may simultaneously perform the input signal collection function and the progress output.

Hereinabove, although the embodiments of the present disclosure have been described with reference to the accompanying drawings, those of ordinary skill in the technical field to which the present disclosure belongs will be able to understand that the present disclosure may be implemented in other concrete forms without changing the technical idea or essential features. Therefore, it should be understood that the embodiments described above are illustrative in all respects and not limiting.

The vehicle disclosed in embodiments of the present disclosure may calculate the progress corresponding to the process for the automatic parking.

In addition, the vehicle may output the information corresponding to the progress through the output device included in the vehicle or output the information corresponding to the progress through the terminal output device included in the external terminal in communication with the vehicle based on the scheme for collecting the user input.

The output device may include various devices such as the display, the audio output device, the lighting device, the haptic module, or the like, and the user may intuitively recognize whether the automatic parking function operates normally and the estimated time required for the automatic parking through the output information.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A vehicle comprising:
a collecting device configured to collect environment information and a user input for automatic parking of the vehicle;
an automatic parking controller configured to perform the automatic parking of the vehicle based on the environment information and the user input; and
a behavior controller configured to control a behavior of the vehicle in response to control of the automatic parking controller,
wherein the automatic parking controller is configured to:
calculate a first progress corresponding to a process of determining whether the user input is a wake-up request;
calculate a second progress corresponding to a process of acquiring a control right for the behavior controller based on the user input;
calculate a third progress corresponding to a process of determining whether the user input is an execution request for the automatic parking;
calculate a fourth progress corresponding to a process of generating control information for the behavior controller based on the environment information;
calculate a fifth progress corresponding to a process of controlling the behavior of the vehicle based on the control information; and
represent the first to the fifth progress as a predetermined percentage when one of the first to the fifth progress is completed.

2. A vehicle comprising:
a collecting device configured to collect environment information and a user input for automatic parking of the vehicle;
an automatic parking controller configured to perform the automatic parking of the vehicle based on the environment information and the user input, wherein the automatic parking controller is configured to:
calculate a first progress corresponding to a process of determining whether the user input is a wake-up request;
calculate a second progress corresponding to a process of acquiring a control right for the behavior controller based on the user input;
calculate a third progress corresponding to a process of determining whether the user input is an execution request for the automatic parking;
calculate a fourth progress corresponding to a process of generating control information for the behavior controller based on the environment information;
calculate a fifth progress corresponding to a process of controlling the behavior of the vehicle based on the control information; and
represent the first to the fifth progress as a predetermined percentage when one of the first to the fifth progress is completed;
a behavior controller configured to control a behavior of the vehicle in response to control of the automatic parking controller; and
an output device configured to output information corresponding respectively to the first progress, the second progress, the third progress, the fourth progress, and the fifth progress, wherein the output device includes at least one device selected from the group consisting of a display, a lighting device, an audio output device, or a haptic module.

3. The vehicle of claim 1, wherein the collecting device includes an input device, and wherein the user input is collected through the input device.

4. The vehicle of claim 3, wherein the automatic parking controller is configured to determine that the user input is the wake-up request and calculate the first progress when the user input lasts for a first wake-up time or longer.

5. The vehicle of claim 1, further comprising a communication device configured to receive an input signal from an external terminal, wherein the collecting device is configured to collect the user input based on the input signal.

6. The vehicle of claim 5, wherein the environment information includes information on a location of a user, and wherein the automatic parking controller is configured to determine that the user input is the wake-up request and calculate the first progress when the location of the user is outside the vehicle and the user input based on the input signal lasts for a second wake-up time or longer.

7. The vehicle of claim 6, wherein:
the external terminal includes a terminal output device configured to output information corresponding respectively to the first progress, the second progress, the third progress, the fourth progress, and the fifth progress; and
the automatic parking controller is configured to transmit the information corresponding respectively to the first progress, the second progress, the third progress, the fourth progress, and the fifth progress to the external terminal through the communication device.

8. The vehicle of claim 1, wherein the automatic parking controller is configured to initiate acquiring the control right for the behavior controller when the user input lasts for an automatic control activation time or longer.

9. The vehicle of claim 8, wherein:
the behavior controller includes at least one controller selected from the group consisting of a torque controller configured to control a torque of the vehicle, a steering controller configured to control a direction of the vehicle, a shift controller configured to control a gear of the vehicle, a braking controller configured to control deceleration of the vehicle, and a body controller configured to control an electronic device included in the vehicle; and
the automatic parking controller is configured to calculate the second progress based on whether a control right for the torque controller, the steering controller, the shift controller, the braking controller, or the body controller is acquired.

10. The vehicle of claim 1, wherein the automatic parking controller is configured to:
determine that the user input is the execution request for the automatic parking when the user input lasts for an automatic parking request time or longer; and
calculate the third progress when the user input is determined to be the execution request for the automatic parking.

11. The vehicle of claim 10, wherein:
the environment information includes information on a parking space and information on a road surface resistance;
the control information for the behavior controller includes steering information for a behavior direction of the vehicle, shift information for controlling a moving speed of the vehicle, and torque information for the vehicle to overcome the road surface resistance; and
the automatic parking controller is configured to calculate the fourth progress based on at least one of the steering information, the shift information, or the torque information, when the user input is determined to be the execution request for the automatic parking.

12. The vehicle of claim 11, wherein:
the steering information includes information on a target steering angle for moving the vehicle to the parking space, a current steering angle, and an average steering speed of the vehicle; and
the automatic parking controller is configured to calculate the fourth progress based on a time it takes for the current steering angle to reach the target steering angle of the vehicle.

13. The vehicle of claim 11, wherein:
the shift information includes information on a target speed for reaching the parking space, a shift request time, and a shift completion time; and
the automatic parking controller is configured to calculate the fourth progress based on the shift request time and the shift completion time.

14. The vehicle of claim 11, wherein:
the torque information includes information on a target torque for overcoming the road surface resistance, information on a current torque, and information on an average torque increase speed; and
the automatic parking controller is configured to calculate the fourth progress based on a time it takes for the current torque to reach the target torque.

15. The vehicle of claim 1, wherein:
the environment information includes information on a road surface resistance; and
the automatic parking controller is configured to calculate the fifth progress based on a time it takes for the vehicle to overcome the road surface resistance based on the control information.

16. The vehicle of claim 15, wherein, when the vehicle does not overcome the road surface resistance based on the control information, the automatic parking controller is configured to:
calculate additional control information for the behavior controller based on the environment information; and
calculate the fifth progress based on the time it takes for the vehicle to overcome the road surface resistance based on the additional control information.

17. The vehicle of claim 1, wherein:
the environment information includes information on a parking route and GPS information on a location of the vehicle; and
the automatic parking controller is configured to calculate the first progress, the second progress, the third progress, the fourth progress, and the fifth progress using the information on the parking route and the GPS information on the location of the vehicle.

18. A method for controlling automatic parking of a vehicle, the method comprising:
collecting, by a collecting device, environment information and a user input for the automatic parking of the vehicle;
determining, by an automatic parking controller, whether the user input is a wake-up request;
calculating a first progress corresponding to the determination on whether the user input is the wake-up request;
acquiring, by the automatic parking controller, a control right for a behavior controller based on the user input;
calculating a second progress corresponding to acquiring the control right;
determining, by the automatic parking controller, whether the user input is an execution request for the automatic parking;
calculating a third progress corresponding to the determination on whether the user input is the execution request for the automatic parking;
generating, by the automatic parking controller, control information for the behavior controller based on the environment information;
calculating a fourth progress corresponding to the generation of the control information;
controlling, by the automatic parking controller, a behavior of the vehicle based on the control information;
calculating a fifth progress corresponding to the control of the behavior of the vehicle; and
representing the first to the fifth progress as a predetermined percentage when one of the first to the fifth progress is completed.

19. The method of claim 18, further comprising outputting, by an output device included in the vehicle, information corresponding respectively to the first progress, the second progress, the third progress, the fourth progress, and the fifth progress.

20. The method of claim 18, wherein the collecting device includes an input device, and wherein the method further comprises:
collecting, by the collecting device, the user input through the input device;
determining, by the automatic parking controller, that the user input is the wake-up request when the user input is maintained for a first wake-up time or longer; and
calculating, by the automatic parking controller, the first progress when the user input is determined to be the wake-up request.

21. The method of claim 18, further comprising:
collecting, by the collecting device, the environment information for the automatic parking including information on a location of a user;
receiving, by a communication device included in the vehicle, an input signal from an external terminal;
collecting, by the collecting device, the user input based on the input signal;
determining, by the automatic parking controller, the user input as the wake-up request when the location of the user is outside the vehicle and the user input based on the input signal is maintained for a second wake-up time or longer; and
calculating, by the automatic parking controller, the first progress when the user input is determined to be the wake-up request.

22. The method of claim 21, wherein the external terminal includes a terminal output device for outputting information corresponding respectively to the first progress, the second progress, the third progress, the fourth progress, and the fifth progress, and wherein the method further comprises:
transmitting, by the automatic parking controller, the information corresponding respectively to the first progress, the second progress, the third progress, the fourth progress, and the fifth progress to the external terminal through the communication device; and
outputting, by the terminal output device included in the external terminal, the information corresponding respectively to the first progress, the second progress, the third progress, the fourth progress, and the fifth progress.

* * * * *